(12) United States Patent
Inomata

(10) Patent No.: US 11,641,433 B2
(45) Date of Patent: May 2, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Kohshiro Inomata, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 193 days.

(21) Appl. No.: 16/568,189

(22) Filed: Sep. 11, 2019

(65) Prior Publication Data

US 2020/0099810 A1 Mar. 26, 2020

(30) Foreign Application Priority Data

Sep. 21, 2018 (JP) .............................. JP2018-177962

(51) Int. Cl.
*H04N 1/00* (2006.01)

(52) U.S. Cl.
CPC ..... *H04N 1/00514* (2013.01); *H04N 1/00503* (2013.01); *H04N 1/00938* (2013.01); *H04N 2201/0094* (2013.01)

(58) Field of Classification Search
CPC ........... H04N 1/00514; H04N 1/00503; H04N 1/00938; H04N 2201/0094
USPC ....................................................... 358/1.13
See application file for complete search history.

(56) References Cited

U.S. PATENT DOCUMENTS

| 8,949,973 | B2 | 2/2015 | Nagata |
| 10,104,255 | B2 | 10/2018 | Ueda |
| 2011/0051165 | A1* | 3/2011 | Yamada .............. H04N 1/00413 358/1.15 |
| 2016/0216975 | A1 | 7/2016 | Hashimoto |
| 2016/0337531 | A1* | 11/2016 | Masui ................. H04N 1/00344 |
| 2017/0046105 | A1* | 2/2017 | Masui .................... G06F 3/1293 |
| 2019/0146726 | A1* | 5/2019 | B T .......................... G06F 3/126 358/1.15 |

FOREIGN PATENT DOCUMENTS

| JP | 2007279792 | 10/2007 |
| JP | 2008258893 | 10/2008 |
| JP | 2008262251 | 10/2008 |
| JP | 2016139200 | 8/2016 |
| JP | 2017038326 | 2/2017 |
| JP | 2018101209 | 6/2018 |

OTHER PUBLICATIONS

"Office Action of Japan Counterpart Application" with English translation thereof, dated Jun. 28, 2022, p. 1-p. 5.
Office Action of Japan Counterpart Application, with English translation thereof, dated Dec. 20, 2022, pp. 1-5.

* cited by examiner

*Primary Examiner* — Neil R McLean
(74) *Attorney, Agent, or Firm* — JCIPRNET

(57) ABSTRACT

An information processing apparatus includes an acquiring unit, an executing unit, and a controller. The acquiring unit acquires operational information indicating an operation performed at a second apparatus by a user. The executing unit executes a process. The controller causes a display to display information indicating a recommended process to be executed by the executing unit after the operation. The recommended process is set based on the operational information.

20 Claims, 4 Drawing Sheets

FIG. 3

| USER NAME | TERMINAL IDENTIFICATION INFORMATION | TERMINAL TYPE INFORMATION | APPLICATION NAME | PARAMETER | DATA NAME | TIME OF OPERATION |
|---|---|---|---|---|---|---|
| α | A1 | B1 | C1 | D1 | E1 | ... |
| ... | ... | ... | ... | ... | ... | ... |

FIG. 4

| USER NAME | FIRST APPLICATION | FIRST PARAMETER | FIRST DATA | SECOND APPLICATION | SECOND PARAMETER | SECOND DATA |
|---|---|---|---|---|---|---|
| α | C1 | D1 | E1 | C2 | D2 | E2 |
| α | C1 | D1 | E1 | C2 | D2 | E2 |
| α | C1 | D1 | E1 | C3 | D3 | E3 |
| ... | ... | ... | ... | ... | ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-177962 filed Sep. 21, 2018.

BACKGROUND

(i) Technical Field

The present disclosure relates to information processing apparatus and non-transitory computer readable media.

(ii) Related Art

There are cases where a process is executed by using multiple apparatuses. For example, after a user operates a first apparatus, a process using the result of the operation may conceivably be executed in a second apparatus different from the first apparatus.

Japanese Unexamined Patent Application Publication No. 2008-258893 discloses an apparatus that causes a display unit to display a customization screen in accordance with a logged-in user in a case where the logged-in user is authenticated that the user is authorized to use an image processing apparatus.

Japanese Unexamined Patent Application Publication No. 2007-279792 discloses an apparatus that controls activation and deactivation of an application program for each time frame based on a usage condition of the application program in a past time frame.

Japanese Unexamined Patent Application Publication No. 2016-139200 discloses an apparatus that selects electronic data corresponding to a prioritized application that has received an activation request from a user, and activates the prioritized application.

In a case where the user operates a second apparatus and subsequently operates a first apparatus different from the second apparatus, it is conceivable that the user may manually set a process to be executed in the first apparatus after operating the second apparatus. However, this results in increased work for the user.

SUMMARY

Aspects of non-limiting embodiments of the present disclosure relate to reducing the work for a user, as compared with a case where the user operates a second apparatus and subsequently manually sets a process to be executed in an information processing apparatus different from the second apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an acquiring unit, an executing unit, and a controller. The acquiring unit acquires operational information indicating an operation performed at a second apparatus by a user. The executing unit executes a process. The controller causes a display to display information indicating a recommended process to be executed by the executing unit after the operation. The recommended process is set based on the operational information.

BRIEF DESCRIPTION OF THE DRAWINGS

Exemplary embodiments of the present disclosure will be described in detail based on the following figures, wherein:

FIG. 3 illustrates an operational-information management table;

FIG. 4 illustrates an execution-history management table; and

DETAILED DESCRIPTION

Figure 1:
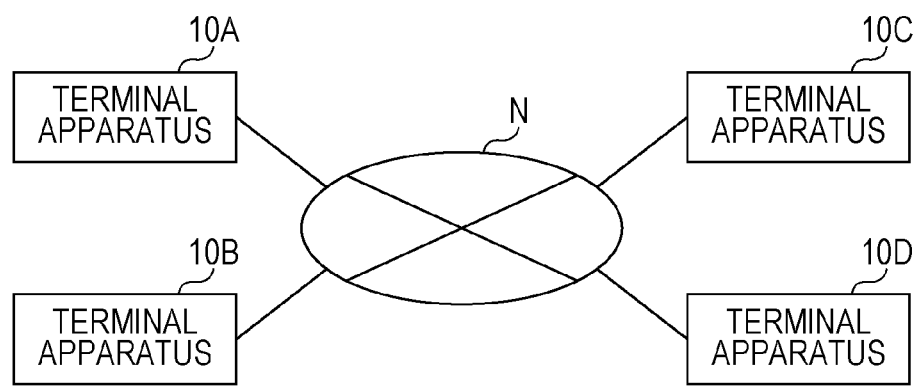
FIG. 1 is a block diagram illustrating the configuration of an information processing system according to an exemplary embodiment of the present disclosure.

An information processing system according to an exemplary embodiment of the present disclosure will now be described with reference to FIG. 1. FIG. 1 illustrates an example of the information processing system according to this exemplary embodiment.

The information processing system according to this exemplary embodiment includes multiple terminal apparatuses. In the example shown in FIG. 1, the information processing system includes terminal apparatuses 10A, 10B, 10C, and 10D. If the terminal apparatuses do not have to be differentiated from one another, each terminal apparatus will be referred to as "terminal apparatus 10" hereinafter. The number of terminal apparatuses 10 shown in FIG. 1 is merely an example so long as multiple terminal apparatuses 10 are included in the information processing system. The terminal apparatuses 10 have a function of communicating with one another via a communication path N, such as the Internet or another network (such as a local area network (LAN)). Alternatively, each terminal apparatus 10 may communicate with another apparatus without the intervention of the communication path N. Moreover, an apparatus such as a server may be included in the information processing system.

Each terminal apparatus 10 as an information processing apparatus has a function of executing a process. The conceptual category of each terminal apparatus 10 may include, for example, a so-called information apparatus, a so-called video apparatus, a so-called audio apparatus, and a so-called household electrical appliance. Each terminal apparatus 10 used may be, for example, an image forming apparatus having an image forming function (such as a printing function, a scanning function, a copying function, and/or a facsimile function), a personal computer (PC), a tablet PC, a smartphone, or a mobile phone. Needless to say, other types of apparatuses may be used as the terminal apparatuses 10.

For example, it is assumed that the terminal apparatuses 10A and 10B are PCs, the terminal apparatus 10C is a smartphone, and the terminal apparatus 10D is an image forming apparatus.

The process executed by each terminal apparatus 10 may be realized by using application software (referred to as "application" hereinafter), hardware, or a combination of both an application and hardware. For example, the process is executed by causing the application and the hardware to operate in accordance with set parameters.

Figure 2:
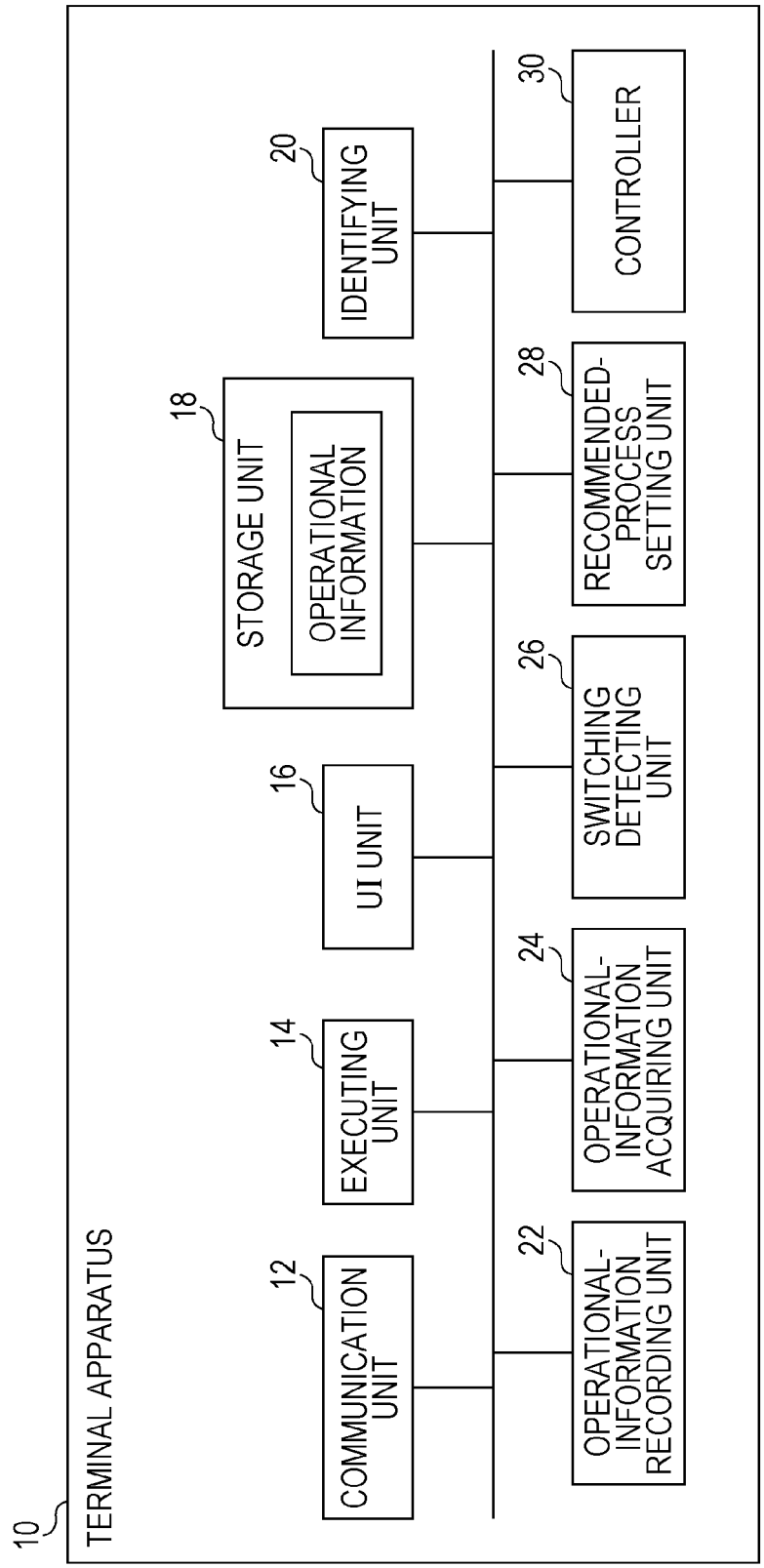
FIG. 2 is a block diagram illustrating the configuration of a terminal apparatus according to an exemplary embodiment of the present disclosure.

The configuration of each terminal apparatus 10 will be described in detail below with reference to FIG. 2. FIG. 2 illustrates an example of the configuration of the terminal apparatus 10. In FIG. 2, components that are common among the terminal apparatuses 10 are illustrated, whereas components unique to the individual terminal apparatuses 10 are not illustrated.

A communication unit 12 is a communication interface and has a function for transmitting information to another apparatus and a function for receiving information transmitted from another apparatus. The communication unit 12 may have a wireless communication function or a wired communication function.

An executing unit 14 is configured to execute a process by using at least one of the application and the hardware. For example, if the terminal apparatus 10 is an image forming apparatus, the executing unit 14 is configured to execute an image forming process. In detail, the executing unit 14 executes at least one of a printing process, a scanning process, a copying process, and a facsimile exchanging process.

A UI unit 16 is a user interface and includes a display unit and an operable unit. The display unit is a display device, such as a liquid crystal display or an organic light emitting diode (OLED) display. The operable unit is an input device, such as a keyboard and/or a mouse. A user interface (such as a touchscreen) serving both as a display unit and an operable unit may also be used as the UI unit 16. Furthermore, the UI unit 16 may also include a sound generator that generates sound, such as a loudspeaker, and a sound receiver that receives input of sound, such as a microphone.

A storage unit 18 is one or more storage regions storing various types of information. Each storage region may be defined as one or more storage devices (e.g., physical drives, such as a hard disk drive or a memory) provided in the terminal apparatus 10, or may be defined as logical partitions or logical drives set in one or more storage devices. For example, the storage unit 18 stores applications, an operating system (OS), and parameters, such as set values.

The storage unit 18 also stores operational information. The operational information indicates an operation that a user has performed at the terminal apparatus 10 storing the operational information. The operational information may also be regarded as information indicating operational history. The conceptual category of the operation includes, for example, execution of a process using an application and execution of a process using hardware. For example, the operational information indicates a correspondence relationship among user identification information for identifying the user who has performed the operation, terminal identification information for identifying the terminal apparatus 10 on which the operation has been performed, terminal type information indicating the type of the terminal apparatus 10, process information indicating the process executed in accordance with the operation, and data identification information for identifying data to which the process is applied. More specifically, the process information includes application identification information for identifying an application executed in accordance with the operation and a parameter used in the application. The user identification information is, for example, information indicating the name of the user or a user ID. The terminal identification information is, for example, information indicating the name of the terminal apparatus 10 or address information (such as a media access control (MAC) address or an Internet Protocol (IP) address). The data identification information is, for example, the name of data. The application identification information is, for example, the name of the application. The operational information may also include operation time information indicating the time and date on which the operation is performed. When the terminal apparatus 10 is operated, the operational information is stored in the storage unit 18 in a time-series fashion.

An identifying unit 20 is configured to identify a user. For example, the identifying unit 20 identifies the user based on user identification information input to the terminal apparatus 10. For example, the user identification information may be input to the terminal apparatus 10 by the user operating the UI unit 16, may be input to the terminal apparatus 10 by using an integrated-circuit (IC) card, or may be input to the terminal apparatus 10 by using a mobile terminal apparatus, such as a smartphone. For example, the user identification information is input to the terminal apparatus 10 when the terminal apparatus 10 is logged in, and the identifying unit 20 identifies the logged-in user based on the user identification information. The user may log into the terminal apparatus 10 by inputting, for example, a password and a user ID to the terminal apparatus 10.

An operational-information recording unit 22 is configured to record the operational information, indicating the operation performed at the terminal apparatus 10 by the user, in the storage unit 18 in a time-series fashion in the temporal order in which the operation is performed. For example, every time an operation is performed by the user, the operational-information recording unit 22 generates operational information and records the operational information in the storage unit 18. By referring to the operational information, the operation performed at the terminal apparatus 10 is specified.

An operational-information acquiring unit 24 is configured to acquire the operational information stored in the terminal apparatus 10. For example, after the user logs into the terminal apparatus 10, the operational-information acquiring unit 24 acquires the operational information including the user identification information of the user from the current terminal apparatus 10 and from another terminal apparatus 10 different from the current terminal apparatus 10. The operational-information acquiring unit 24 may acquire the operational information after the user is identified in the terminal apparatus 10.

A switching detecting unit 26 is configured to determine whether or not the terminal apparatus 10 operated by the aforementioned user has been switched to another one based on the operational information acquired by the operational-information acquiring unit 24. Specifically, the switching detecting unit 26 determines whether or not the user is operating a different terminal apparatus 10 after operating a certain terminal apparatus 10. For example, if terminal identification information included in the operational information at a past time point at which an operation is performed most recently with reference to the current time point is different from the terminal identification information of the current terminal apparatus 10, the switching detecting unit 26 determines that the terminal apparatus 10 operated by the user has been switched to another one. An operation corresponding to a past time point at which an operation is performed most recently with reference to the current time point will be referred to as "preceding operation" hereinafter. The terminal apparatus 10 on which the preceding operation has been performed will be referred to as "preceding terminal apparatus 10" hereinafter. If the terminal identification information included in the operational information indicating the preceding operation is the same as the terminal identification information of the current terminal apparatus 10, the switching detecting unit 26 determines that the terminal apparatus 10 operated by the user has not been switched to another one.

As a specific example, it is assumed that the user is currently using the terminal apparatus 10A. If the terminal identification information included in the operational information indicating the preceding operation is different from the terminal identification information of the current terminal apparatus 10A, the switching detecting unit 26 of the terminal apparatus 10A determines that the terminal apparatus 10 operated by the user has been switched to another one. If the two pieces of the terminal identification information are identical, the switching detecting unit 26 determines that the terminal apparatus 10 has not been switched to another one.

As another example, the operational-information acquiring unit 24 may acquire the operational information indicating the preceding operation from the terminal apparatus 10 in which the operational information is stored. If the terminal identification information included in that operational information is different from the terminal identification information of the current terminal apparatus 10, the switching detecting unit 26 determines that the terminal apparatus 10 operated by the user has been switched to another one. If the two pieces of the terminal identification information are identical, the switching detecting unit 26 determines that the terminal apparatus 10 has not been switched to another one.

If the terminal apparatus 10 operated by the user has been switched to another one, a recommended-process setting unit 28 is configured to set a recommended process to be executed by the executing unit 14 of the current terminal apparatus 10 after an operation is performed at the preceding terminal apparatus 10 based on the operational information indicating the preceding operation. In detail, the recommended-process setting unit 28 sets an application to be executed by the executing unit 14 of the current terminal apparatus 10 as a recommended application. Moreover, the recommended-process setting unit 28 may set a parameter to be used in the recommended application as a recommended parameter.

For example, the recommended-process setting unit 28 may set a recommended process based on process execution history information. The execution history information indicates the process execution history for each user and indicates, for example, previous and subsequent processes executed in the past in accordance with a command from the same user. Specifically, the execution history information indicates a correspondence relationship between information indicating a first process executed in the preceding terminal apparatus 10 operated by the user and information indicating a second process executed in a terminal apparatus 10 (referred to as "subsequent terminal apparatus 10" hereinafter) operated by the same user subsequently to the preceding terminal apparatus 10. More specifically, the execution history information indicates a correspondence relationship among application identification information of a first application for realizing the first process, data identification information of first data to which the first application is applied, a first parameter used in the first application, application identification information of a second application for realizing the second process, data identification information of second data to which the second application is applied, and a second parameter used in the second application. These pieces of information are associated with each user. The parameters and the data identification information do not have to be included in the execution history information.

The execution history information may be created in advance based on the operational information of each user and may be stored in the terminal apparatuses 10 and be shared by the terminal apparatuses 10. Alternatively, the execution history information may be stored in an apparatus such as a server. Needless to say, the recommended-process setting unit 28 may create the execution history information by referring to the operational information of each user.

The recommended-process setting unit 28 refers to the execution history information so as to calculate a usage frequency of each of the second applications corresponding to the same first application, and sets the second application with the highest usage frequency as a recommended application. Alternatively, the recommended-process setting unit 28 may calculate a usage frequency of each of the second parameters used in the second applications and set the second parameter with the highest usage frequency as a recommended parameter. As another alternative, the recommended-process setting unit 28 may calculate a usage frequency of each piece of second data to which the second applications are applied, and set the second data with the highest usage frequency data as recommended data. A usage frequency is, for example, the number of times of usage within a unit period.

The recommended-process setting unit 28 may set one or more second applications with a usage frequency higher than or equal to a predetermined threshold value as a recommended application or applications. In this case, the recommended-process setting unit 28 may give priority ranks to the recommended applications, such that the recommended application with the highest usage frequency is given the highest priority rank. Likewise, the recommended-process setting unit 28 may set one or more second parameters with a usage frequency higher than or equal to a predetermined threshold value as a recommended parameter or parameters, or may set one or more pieces of second data with a usage frequency higher than or equal to a predetermined threshold value as recommended data. Similar to the recommended application or applications, the recommended-process setting unit 28 may give priority ranks to the recommended parameters, or may give priority ranks to the pieces of recommended data. The threshold values may be changed by, for example, the user.

The recommended-process setting unit 28 may set the recommended application, the recommended parameter, or the recommended data by using machine learning, such as deep learning, instead of using the above-described execution history information. For example, by using preceding data containing the first application, the first parameter, and the first data as input data, and using subsequent data containing the second application, the second parameter, and the second data as correct data, a learning model is established. The recommended-process setting unit 28 uses this learning model to presume a recommended application, a recommended parameter, or recommended data with respect to the input data. The learning models may be accumulated, or a new learning model may be established after discarding an old learning model every predetermined period (e.g., every three months).

In a case where a learning model is to be used, if the user does not use the recommended application, the learning model may be corrected by using the recommended application as incorrect data.

For example, the second process may be a process executed on a resultant of the operation in the preceding terminal apparatus 10, that is, a resultant of the first process. As a specific example, if printing is executed as the first process, a process, such as scanning, executed on a printed material produced as a result of the printing may correspond to the second process. The printed material corresponds to the resultant of the operation in the preceding terminal apparatus 10. As another example, if image processing is executed as the first process, a process of forwarding data produced as a result of the image processing corresponds to the second process. The data corresponds to the resultant of the first process. Needless to say, the second process may be a process not executed on the resultant of the first process.

A controller 30 is configured to control the operation of each unit of the terminal apparatus 10. For example, the controller 30 causes the display unit of the UI unit 16 to display information indicating the recommended application. The controller 30 may create a message for recommending execution of the recommended application to the user and may cause the display unit to display the message. The controller 30 may cause the display unit of the UI unit 16 to display a list of information indicating recommended applications, information indicating recommended parameters, or information indicating pieces of recommended data in accordance with the priority ranks.

The controller 30 may also set a recommended parameter in the recommended application. When the recommended application is activated, the recommended application is activated in a state where the recommended parameter is set in the recommended application.

The terminal apparatus 10 will be described below in more detail.

The operational information will be described in detail with reference to FIG. 3. FIG. 3 illustrates an example of an operational-information management table as an example of operational information. In the operational-information management table, for example, information indicating the name of the user who has performed the operation at the terminal apparatus 10, terminal identification information of the terminal apparatus 10, terminal type information indicating the type of the terminal apparatus 10, information indicating the name of an application executed in accordance with the operation, a parameter used in the application, information indicating the name of data to which the application is applied, and information indicating the time and date on which the operation is performed are associated with one another. Every time an operation is performed at the terminal apparatus 10, the operational-information recording unit 22 provided in the terminal apparatus 10 records the above-described information in the operational-information management table stored in the terminal apparatus 10. The data in the operational-information management table is stored in the storage unit 18 of the terminal apparatus 10. Needless to say, the operational information may be recorded in accordance with a format other than the table format. By referring to the operational-information management table, what kind of operation has been performed at which one of the terminal apparatuses 10 is specified. More specifically, what kind of application has been executed on what type of data by using what kind of parameter at which one of the terminal apparatuses 10 is specified.

The execution history information will be described in detail with reference to FIG. 4. FIG. 4 illustrates an example of an execution-history management table as an example of execution history information. In the execution-history management table, for example, information indicating the name of a user, information indicating the name of a first application executed in a preceding terminal apparatus 10 operated by the user, a first parameter used in the first application, information indicating first data to which the first application is applied, information indicating the name of a second application executed in a subsequent terminal apparatus 10 operated by the user subsequently to the preceding terminal apparatus 10, a second parameter used in the second application, and information indicating second data to which the second application is applied are associated with each other. These pieces of information are associated with each user. For example, in a case where the recommended-process setting unit 28 of the subsequent terminal apparatus 10 logged in by the user is to set a recommended process, the execution history management table related to the user may be created based on operational information of the user, or the execution history management table related to each user may be created in advance such that the data in the execution history management table are shared by the terminal apparatuses 10. By referring to the execution history management table, it is specified what kind of operation is performed at the subsequent terminal apparatus 10 after what kind of operation is performed at the preceding terminal apparatus 10.

As an example, the recommended-process setting unit 28 sets the recommended process based on the execution history management table. Needless to say, the recommended-process setting unit 28 may set the recommended process by using machine learning, such as deep learning, instead of using the execution history management table.

Figure 5:
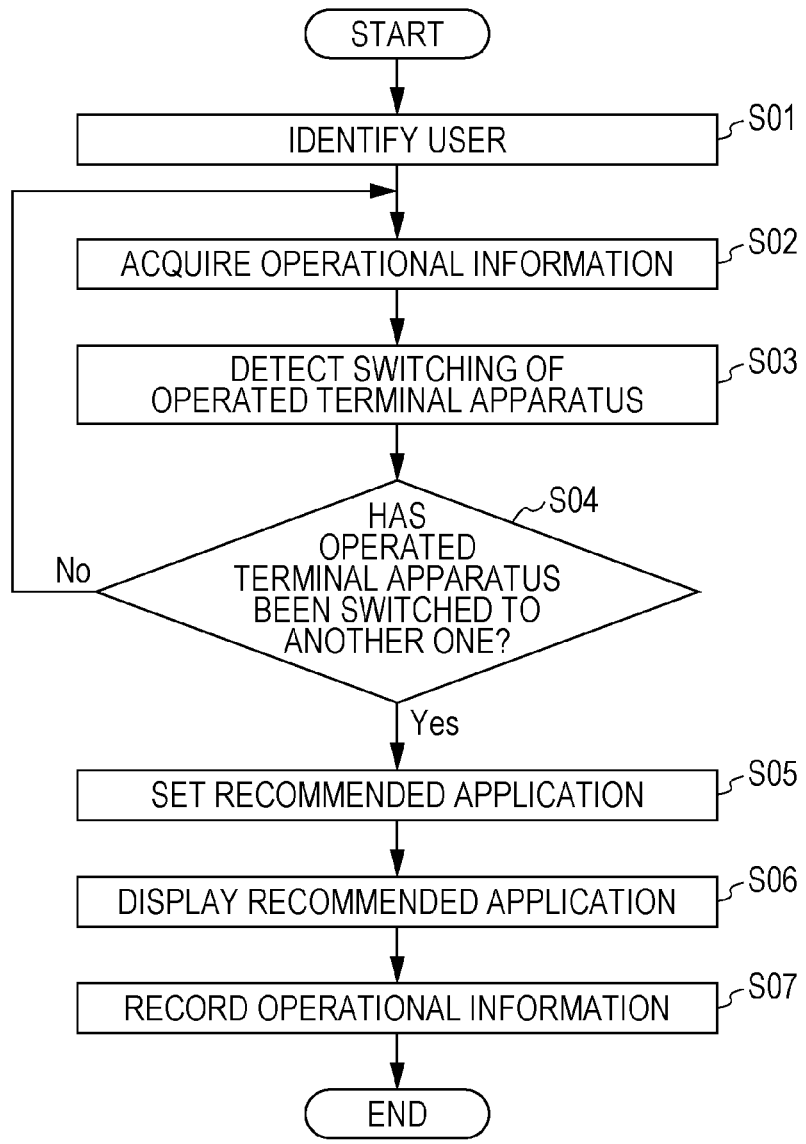
FIG. 5 illustrates a flowchart related to the operation of the terminal apparatus.

The operation of the terminal apparatus 10 will be described in detail below with reference to FIG. 5. FIG. 5 illustrates a flowchart related to the operation of the terminal apparatus 10. It is assumed that the terminal apparatus 10D as an image forming apparatus is operated by a user α. In other words, the terminal apparatus 10D corresponds to the subsequent terminal apparatus.

First, in step S01, the user α uses an IC card or the UI unit 16 of the terminal apparatus 10D to input a user ID and a password, whereby the identifying unit 20 of the terminal apparatus 10D identifies the user α. When the user α is identified, the user α is successfully logged into the terminal apparatus 10D. Alternatively, the identifying unit 20 may identify the user α by using an authentication server where user identification information is stored. In a terminal apparatus 10, such as a PC or a smartphone, assumed to be used by only the user α, since user identification is performed by using the user identification information stored in the terminal apparatus 10, the identification process in step S01 does not have to be executed.

Subsequently, in step S02, the operational-information acquiring unit 24 of the terminal apparatus 10D acquires operational information including the user identification information of the user α from the terminal apparatuses 10A, 10B, 10C, and 10D. The operational-information acquiring unit 24 of the terminal apparatus 10D may acquire all pieces of operational information including the user identification information of the user α, or may refer to the time and date on which the operation is performed by the user α so as to only acquire operational information indicating a preceding operation performed by the user α from a terminal apparatus or apparatuses 10 where the operational information is stored. In the storage unit 18 of each terminal apparatus 10, address information of each terminal apparatus 10 included in the information processing system is stored in advance. The operational-information acquiring unit 24 of the terminal apparatus 10D uses the address information of each terminal apparatus 10 to access the terminal apparatus 10 so as to acquire operational information therefrom. As another example, address information of a terminal apparatus 10 storing operational information including the user identification information of the user α may be stored as an example of attribute information of the user α in an authentication server. In this case, the operational-information acquiring unit 24 of the terminal apparatus 10D accesses the terminal apparatus 10 by using the address information and acquires the operational information including the user identification information of the user α from the terminal apparatus 10.

In step S03, the switching detecting unit 26 of the terminal apparatus 10D detects that the terminal apparatus 10 operated by the user α has been switched to another one based on the operational information acquired by the operational-information acquiring unit 24. Specifically, the switching detecting unit 26 of the terminal apparatus 10D determines whether or not the terminal apparatus 10 operated by the user α has been switched to another one. If the terminal identification information included in the operational information indicating the preceding operation is different from the terminal identification information of the terminal apparatus 10D currently being used by the user α, the switching detecting unit 26 of the terminal apparatus 10D determines that the terminal apparatus 10 operated by the user α has been switched to another one. If the two pieces of the terminal identification information are identical, the switching detecting unit 26 of the terminal apparatus 10D determines that the terminal apparatus 10 operated by the user α has not been switched to another one. In this example, it is assumed that the terminal identification information included in the operational information indicating the preceding operation is the terminal identification information of the terminal apparatus 10A as a PC. In this case, the terminal apparatus 10 operated by the user α has been switched from the terminal apparatus 10A to the terminal apparatus 10D. In other words, this implies that the user α has been operating the terminal apparatus 10A immediately before operating the terminal apparatus 10D. In a PC or a smartphone, operational information may be acquired when the screen is unlocked, and it may be determined whether or not the operated terminal apparatus 10 has been switched to another one.

If the terminal apparatus 10 operated by the user α has been switched to another one (Yes in step S04), the recommended-process setting unit 28 of the terminal apparatus 10D sets a recommended application based on the operational information indicating the preceding operation in step S05.

First, the recommended-process setting unit 28 refers to the operational information indicating the preceding operation so as to specify a first application executed in the preceding terminal apparatus 10A and a first parameter used in the first application. In this case, it is assumed that a first application C1 is executed in the terminal apparatus 10A, and a first parameter D1 is used. Then, the recommended-process setting unit 28 creates an execution-history management table indicating the execution history of the first application C1 based on each piece of operational information including the user identification information of the user α. FIG. 4 illustrates the created execution-history management table. Then, the recommended-process setting unit 28 refers to the execution-history management table to calculate a usage frequency of each second application associated with the same first application C1, and sets the second application with the highest usage frequency as a recommended application. In the past, the first application C1 is executed in the preceding terminal apparatus 10, a second application C2 is subsequently performed twice in the subsequent terminal apparatus 10, and a second application C3 is used once. Because the number of times the second application C2 is used is the largest among the second applications associated with the same first application C1, the recommended-process setting unit 28 sets the second application C2 as a recommended application. Likewise, the recommended-process setting unit 28 sets a second parameter D2 as a recommended parameter. Alternatively, the recommended-process setting unit 28 does not necessarily have to set the recommended parameter.

The recommended application and the recommended parameter may be set by an apparatus such as a server instead of being set by the terminal apparatus 10D.

In the above example, the recommended application and the recommended parameter are set by using the execution-history management table. Alternatively, the recommended application and the recommended parameter may be set by using machine learning, such as deep learning.

If the terminal apparatus 10 operated by the user α has not been switched to another one (No in step S04), the process returns to step S02. As another example, the controller 30 may cause the display unit of the UI unit 16 to display a screen, such as a menu screen.

In a case where the recommended application is set, the controller 30 causes the display unit of the UI unit 16 to display information indicating the recommended application in step S06. Furthermore, the executing unit 14 may activate the recommended application. In a case where the recommended parameter is set, the controller 30 sets the recommended parameter in the recommended application, and activates the recommended application in this state.

If a certainty factor indicating the degree of certainty of the recommended application is lower than or equal to a predetermined threshold value, the controller 30 may cause the display unit of the UI unit 16 to display a default screen (such as a home screen that displays a list of applications) instead of causing the display unit of the UI unit 16 to display the information indicating the recommended application. If the certainty factor of the recommended application is included within a predetermined range, the controller 30 may cause the display unit to display an image, such as an icon, expressing the recommended application larger than other images. A method for calculating the certainty factor is not particularly limited. The certainty factor may be calculated by using a known technique.

In step S07, in a case where the recommended application is activated, the operational-information recording unit 22 records, in the storage unit 18, operational information indicating that the recommended application is operated. In a case where a process according to the recommended application is executed, the operational-information recording unit 22 records, in the storage unit 18, operational information indicating that the process is executed. In this case, the operational-information recording unit 22 also records, as the operational information, information indicating whether or not the recommended application or parameter has been changed.

Accordingly, the recommended application to be executed in the subsequent terminal apparatus 10D is recommended to the user based on the operational information indicating the operation performed at the preceding terminal apparatus 10A.

The operational-information acquiring unit 24 may acquire operational information indicating an operation most recently performed by the user α from a terminal apparatus 10 (such as an image forming apparatus) of the same type as the terminal apparatus 10D currently being used by the user α, and the recommended-process setting unit 28 may set a recommended application and a recommended parameter based on the acquired operational information. The recommended-process setting unit 28 may set a recommended application based on operational information acquired regardless of the type of terminal apparatus 10, may also set a recommended application based on operational information acquired from the terminal apparatus 10 of the same type as the terminal apparatus 10D, and may set the recommended application with the higher priority level between these recommended applications as an ultimate recommended application.

The controller 30 may change the timing at which the recommended application or the recommended parameter is recommended to the user, that is, the timing at which these pieces of information are displayed on the display unit, in accordance with the type of the subsequent terminal apparatus 10. For example, if the subsequent terminal apparatus 10 corresponds to a terminal apparatus that demands a log-in operation, the controller 30 of the subsequent terminal apparatus 10 causes the display unit to display information, such as a recommended application, after the user logs into the subsequent terminal apparatus 10 or at the time of the log-in process. A terminal apparatus 10 shared by multiple users corresponds to the terminal apparatus 10 that demands a log-in operation. If the subsequent terminal apparatus 10 corresponds to a terminal apparatus that does not demand a log-in operation, the controller 30 of the subsequent terminal apparatus 10 may cause the display unit to display information, such as a recommended application, when the user operates the subsequent terminal apparatus 10. A terminal apparatus 10 used by the aforementioned user alone corresponds to the terminal apparatus 10 that does not demand a log-in operation. The terminal apparatus 10 that does not demand a log-in operation stores the user identification information of the user using the terminal apparatus 10, and the operational-information acquiring unit 24 acquires operational information by using the stored user identification information.

Furthermore, the recommended-process setting unit 28 may set the recommended application or the recommended parameter in view of the preceding terminal apparatus 10. For example, the recommended-process setting unit 28 may calculate a usage frequency of each second application associated with the same first application C1 executed in the past in the preceding terminal apparatus 10A, and may set the second application with the highest usage frequency as a recommended application. Moreover, the recommended-process setting unit 28 may calculate a usage frequency of each second application that is the same as the first application C1 executed in the past in the preceding terminal apparatus 10A and that is executed in the subsequent terminal apparatus 10D, and may set the second application with the highest usage frequency as a recommended application.

A specific example of this exemplary embodiment will be described below.

First Specific Example

In a first specific example, the preceding terminal apparatus 10 is a PC, and the subsequent terminal apparatus 10 is an image forming apparatus. For example, after a user edits data in the PC and performs an operation for storing the data in a document management server, if the user logs into the image forming apparatus, a recommended application is set based on the preceding operation for storing the data in the document management server. For example, an application that acquires the data from the document management server and prints the data is set as a recommended application. Moreover, a recommended parameter may also be set. This application may sometimes be referred to as "pull-print application". For example, a recommended application is automatically selected on the display unit of the UI unit 16 in the image forming apparatus. In a case where an address, such as the uniform resource locator (URL), of the document management server or a print set value is set as a recommended parameter, the recommended parameter is set in the recommended application. Then, a message "do you want to print data stored in document management server?" is displayed on the display unit. If the user gives a command for executing the process (e.g., if the user presses a "Yes" button), the recommended application and the recommended parameter are displayed on the display unit. For example, the recommended application is activated, and a setting screen for the recommended application is displayed on the display unit. In a case where a recommended parameter is set, a setting screen is displayed in a state where the recommended parameter is already input to the setting screen. Then, when the user gives a print execution command, the recommended application is executed, whereby the data stored in the document management server is downloaded to the image forming apparatus where the data is printed. If the user refuses to execute the process (e.g., if the uses presses a "No" button) after the aforementioned message is displayed, the default screen or a screen customized for the user is displayed on the display unit.

Second Specific Example

In a second specific example, the preceding terminal apparatus 10 is an image forming apparatus, and the subsequent terminal apparatus 10 is a PC. For example, it is assumed that a user uses the image forming apparatus to scan a document and performs an operation for storing image data generated as a result of the scanning into a storage region provided in the image forming apparatus. An application that performs the operation may sometimes be referred to as "scan-to-box" application, and the storage region may sometimes be referred to as "box" or "folder". Subsequently, if the user operates the PC (e.g., if the user operates the keyboard or the mouse or cancels a screen saver), a recommended application is set based on the preceding operation for executing the "scan-to-box" application. For example, an application that downloads the image data from the storage region of the image forming apparatus to the PC is set as a recommended application. Moreover, a recommended parameter may also be set. A recommended application is automatically selected on the display unit of the UI unit 16 in the PC. In a case where an address, such as the URL, of the image forming apparatus or identification information of the image data is set as a recommended parameter, the recommended parameter is set in the recommended application. Then, the recommended application and the recommended parameter are displayed on the display unit in accordance with a user command. For example, the recommended application is activated, and a setting screen for the recommended application is displayed on the display unit. In a case where a recommended parameter is set, a setting screen is displayed in a state where the recommended parameter is already input to the setting screen. Then, when the user gives a command for acquiring the image data, the recommended application is executed, whereby the image data stored in the storage region of the image forming apparatus is downloaded to the PC.

Third Specific Example

In a third specific example, the subsequent terminal apparatus 10 acquires operational information, indicating the preceding operation performed by the user currently using the subsequent terminal apparatus 10, from the preceding terminal apparatus 10 of the same type as the subsequent terminal apparatus 10, and sets a recommended application and a recommended parameter based on the operational information.

For example, it is assumed that the user uses an image forming apparatus to execute a print application, so that certain data is printed. The image forming apparatus corresponds to the preceding terminal apparatus 10. Subsequently, the user works on his/her PC or performs a process, such as impressing a signature stamp onto the printed document. Because the PC is of a type different from that of the preceding image forming apparatus serving as the preceding terminal apparatus 10, the PC does not correspond to the subsequent terminal apparatus 10, and a recommended application to be executed in the PC is not set. Subsequently, when the user logs into the image forming apparatus, a document is scanned by the image forming apparatus, and an application that forwards image data generated as a result of the scanning to the PC is set as a recommended application. Moreover, a recommended parameter may also be set. This application may sometimes be referred to as "scan-to-PC" application. The image forming apparatus logged in by the user corresponds to the subsequent terminal apparatus 10. Because the subsequent image forming apparatus is of the same type as the preceding image forming apparatus serving as the preceding terminal apparatus 10, a recommended application to be executed in the subsequent image forming apparatus is set. The subsequent image forming apparatus may be the same as the preceding image forming apparatus, or may be different from the preceding image forming apparatus but of the same type as the preceding image forming apparatus. A recommended application is automatically selected on the display unit of the UI unit 16 in the subsequent image forming apparatus. If an address of the PC serving as a forwarding destination is set as a recommended parameter, the recommended parameter is set in the recommended application. Then, the recommended application and the recommended parameter are displayed on the display unit in accordance with a user command. For example, the recommended application is activated, and a setting screen for the recommended application is displayed on the display unit. In a case where a recommended parameter is set, a setting screen is displayed in a state where the recommended parameter is already input to the setting screen. Then, when the user gives a command for executing the recommended application, the recommended application is executed. Consequently, the document is scanned by the subsequent image forming apparatus, and image data generated as a result of the scanning is forwarded to the PC.

Other exemplary embodiments will be described below.

For example, if the preceding terminal apparatus 10 is a portable terminal apparatus 10, such as a smartphone, and the usage time of the portable terminal apparatus 10 is within a predetermined threshold value (e.g., within 5 minutes), the subsequent terminal apparatus 10 may set a recommended application based on operational information indicating an operation performed in a terminal apparatus 10 used prior to the portable terminal apparatus 10, without referring to operational information indicating an operation performed at the portable terminal apparatus 10.

The recommended-process setting unit 28 may change the recommended process in accordance with the type of the preceding terminal apparatus 10. For example, the recommended-process setting unit 28 may change the recommended application in accordance with the type. In other words, even if the application executed by the preceding terminal apparatus 10 is the same, the recommended-process setting unit 28 may change the recommended application in accordance with the type of the preceding terminal apparatus 10. This process will be described with reference to a specific example. For example, it is assumed that the subsequent terminal apparatus 10 is an image forming apparatus, and the application executed in the preceding terminal apparatus 10 is an application that uploads photographic data to a server. If the type of the preceding terminal apparatus 10 is a PC, the recommended-process setting unit 28 sets a pull-print application that acquires photographic data from a server and prints the photographic data as a recommended application. If the type of the preceding terminal apparatus 10 is a smartphone, the recommended-process setting unit 28 sets an application that causes the display unit of the UI unit 16 in an image forming apparatus to display a two-dimensional barcode for Wi-Fi Direct (registered trademark) as a recommended application. Accordingly, a situation where a process assumed to be subsequently executed varies depending on whether the preceding terminal apparatus 10 is a PC or a smartphone may be coped with.

The recommended-process setting unit 28 may change the recommended process in accordance with a parameter used in a preceding operation. For example, the recommended-process setting unit 28 may change the recommended parameter in accordance with the parameter. In other words, even if the application executed by the preceding terminal apparatus 10 is the same, the recommended-process setting unit 28 may change the recommended parameter in accordance with the parameter used in that application. This process will be described with reference to a specific example. It is assumed that the preceding terminal apparatus 10 is a PC, the subsequent terminal apparatus 10 is an image forming apparatus, and an application that uploads data (such as an uploading operation of a Web browser) is executed in the preceding PC. The URL of the uploading destination is the parameter used in the application. A print application is set as a recommended application to be executed by the image forming apparatus. The recommended parameter is changed in accordance with the URL of the uploading destination for the data. For example, the recommended-process setting unit 28 sets the URL designated the largest number of times as an uploading destination as a recommended parameter. If this URL designated the largest number of times as an uploading destination changes, the recommended parameter also changes accordingly.

The recommended-process setting unit 28 may change the recommended application and the recommended parameter in accordance with the locations where the preceding terminal apparatus 10 and the subsequent terminal apparatus 10 are set. For example, the recommended application and the recommended parameter may vary depending on whether an image forming apparatus as the subsequent terminal apparatus 10 is set within an office or a retail store.

The recommended application and the recommended parameter may be changed in accordance with whether or not the preceding terminal apparatus 10 and the subsequent terminal apparatus 10 each correspond to a shared terminal apparatus used by multiple users. If the subsequent terminal apparatus 10 corresponds to a shared terminal apparatus, the recommended application and the recommended parameter do not have to be recommended to each user.

The terminal apparatuses 10 described above are realized in accordance with, for example, hardware and software operating in cooperation with each other. Specifically, each terminal apparatus 10 includes one or more processors, such as one or more central processing units (CPUs) (not shown). The one or more processors read a program stored in a storage device (not shown) and execute the program so as to realize the functions of the components included in the terminal apparatus 10. The program is stored in the storage device via a recording medium, such as a compact disc (CD) or a digital versatile disc (DVD), or via a communication path, such as a network. As another example, the components of the terminal apparatus 10 may each be realized by a hardware resource, such as a processor, an electronic circuit, or an application specific integrated circuit (ASIC). In order to achieve this, a device, such as a memory device, may be used. As another example, the components of the terminal apparatus 10 may each be realized by a digital signal processor (DSP) or a field programmable gate array (FPGA).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor, configured to:
        acquire operational information indicating a first operation performed at a second apparatus by a user;
        determine whether the second apparatus operated by the user has been switched to another apparatus;
        in response that the second apparatus operated by the user has been switched to the information processing apparatus, cause a display to display information indicating a recommended process to be executed by the information processing apparatus after the first operation, the recommended process being set based on the operational information, wherein the recommended process is a process predicted to be performed at the information processing apparatus by the user subsequent to the first operation performed at the second apparatus by the user.

2. The information processing apparatus according to claim 1,
    wherein the recommended process includes using a result of the first operation performed at the second apparatus.

3. The information processing apparatus according to claim 1, wherein the processor is further configured to:
    identify the user,
        wherein the processor causes the display to display the information indicating the recommended process when identifying the user.

4. The information processing apparatus according to claim 2, wherein the processor is further configured to:
    identify the user,
        wherein the processor causes the display to display the information indicating the recommended process when identifying the user.

5. The information processing apparatus according to claim 1,
    wherein the processor causes the display to display recommended application software that realizes the recommended process and a recommended parameter used in the recommended application software.

6. The information processing apparatus according to claim 2,
    wherein the processor causes the display to display recommended application software that realizes the recommended process and a recommended parameter used in the recommended application software.

7. The information processing apparatus according to claim 3,
    wherein the processor causes the display to display recommended application software that realizes the recommended process and a recommended parameter used in the recommended application software.

8. The information processing apparatus according to claim 4,
    wherein the processor causes the display to display recommended application software that realizes the recommended process and a recommended parameter used in the recommended application software.

9. The information processing apparatus according to claim 1,
    wherein the processor changes the recommended process in accordance with a type of the second apparatus.

10. The information processing apparatus according to claim 2,
    wherein the processor changes the recommended process in accordance with a type of the second apparatus.

11. The information processing apparatus according to claim 3,
    wherein the processor changes the recommended process in accordance with a type of the second apparatus.

12. The information processing apparatus according to claim 4,
    wherein the processor changes the recommended process in accordance with a type of the second apparatus.

13. The information processing apparatus according to claim 1,
    wherein the processor changes the recommended process in accordance with a parameter used in the first operation.

14. The information processing apparatus according to claim 1,
    wherein the operational information includes information indicating application software used in the second apparatus and information indicating a parameter used in the application software.

15. A non-transitory computer readable medium storing a program causing a computer of an information processing apparatus to execute a process for processing information, the process comprising:

acquiring operational information indicating a first operation performed by a user at a second apparatus other than the information processing apparatus;

determining whether the second apparatus operated by the user has been switched to another apparatus;

in response that the second apparatus operated by the user has been switched to the information processing apparatus, displaying information indicating a recommended process to be executed by the information processing apparatus after the first operation, the recommended process being set based on the operational information, wherein the recommended process is a process predicted to be performed at the information processing apparatus by the user subsequent to the first operation performed at the second apparatus by the user.

16. An information processing apparatus comprising:

acquiring means that acquires operational information indicating a first operation performed at a second apparatus by a user;

determining means that determines whether the second apparatus operated by the user has been switched to another apparatus;

control means that, in response that the second apparatus operated by the user has been switched to the information processing apparatus, causes display means to display information indicating a recommended process to be executed by the information processing apparatus after the first operation, the recommended process being set based on the operational information, wherein the recommended process is a process predicted to be performed at the information processing apparatus by the user subsequent to the first operation performed at the second apparatus by the user.

17. The information processing apparatus according to claim 1, wherein the recommended process is predicted based on history information between the first operation performed at the second apparatus used by the user and the information processing apparatus used by the user subsequently to the second apparatus.

18. The information processing apparatus according to claim 17, wherein the recommended process is a process with a highest usage frequency predicted to be performed by the information processing apparatus subsequent to the first operation performed at the second apparatus in the history information.

19. The information processing apparatus according to claim 1, wherein the recommended process is predicted based on machine learning.

20. The information processing apparatus according to claim 1, wherein the first operation is executed by a first application in the second apparatus, wherein the recommendation process is executed by a second application in the information processing apparatus, wherein the second application is different from the first application.

* * * * *